(12) United States Patent
Liao et al.

(10) Patent No.: US 11,840,605 B2
(45) Date of Patent: *Dec. 12, 2023

(54) METHOD FOR MANUFACTURING POLYESTER POLYHYDRIC ALCOHOL

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 31 days.

This patent is subject to a terminal disclaimer.

(21) Appl. No.: 17/337,646

(22) Filed: Jun. 3, 2021

(65) Prior Publication Data

US 2022/0056205 A1    Feb. 24, 2022

(30) Foreign Application Priority Data

Aug. 20, 2020  (TW) .................................. 109128334

(51) Int. Cl.
*C08G 63/85* (2006.01)
*C08G 63/16* (2006.01)

(52) U.S. Cl.
CPC .............. *C08G 63/85* (2013.01); *C08G 63/16* (2013.01)

(58) Field of Classification Search
CPC ........ C08G 63/12; C08G 63/16; C08G 63/78; C08G 63/85
See application file for complete search history.

(56) References Cited

U.S. PATENT DOCUMENTS

| | | | | |
|---|---|---|---|---|
| 3,097,863 A | * | 7/1963 | Moore | B62D 7/144 280/124.179 |
| 4,018,815 A | * | 4/1977 | Vogt | C07C 67/08 560/198 |
| 4,670,580 A | * | 6/1987 | Maurer | C08G 63/78 560/204 |
| 2004/0068059 A1 | * | 4/2004 | Katayama | C08L 75/06 525/466 |
| 2015/0065678 A1 | * | 3/2015 | Hess | C08G 63/80 528/279 |
| 2015/0087789 A1 | * | 3/2015 | Utsunomiya | C08G 18/664 528/308.8 |
| 2022/0056205 A1 | * | 2/2022 | Liao | C08G 63/16 |

FOREIGN PATENT DOCUMENTS

| | | |
|---|---|---|
| CN | 103804665 A | 5/2014 |
| CN | 104508001 A | 4/2015 |
| CN | 108774313 A | 11/2018 |
| EP | 0743334 A1 | 11/1996 |

OTHER PUBLICATIONS

Tao Jiang et al "Step-By-Step Feeding Method for Synthesis of Polyester Polyols", Translation (Year: 1997).*
Walter Dias Vilar "Chemistry and Technology of Polyurethanes", 2002 (Year: 2002).*
Walter Dias Vilar Chemistry and Technology of Polyurethanes, Chapter 1.2.3, 2002 (Year: 2002).*
Th. Rieckmann et al "Poly(Ethylene Terephthalate) Polymerization—Mechanism, Catalysis, Kinetics, Mass Transfer and Reactor Design", Chapter II of Modern polyesters, 2003 (Year: 2003).*
Jiang Tao; Lu Xingjun; Zhao Ming; Hao Weiping. "Synthesis of Polyester Diols by Multistep Feeding of Diols." Polyurethane Industry, 1997, p. 11-14, vol. 12(3).

* cited by examiner

*Primary Examiner* — Frances Tischler
*Assistant Examiner* — Gennadiy Mesh
(74) *Attorney, Agent, or Firm* — Li & Cai Intellectual Property (USA) Office

(57) ABSTRACT

A method for manufacturing polyester polyhydric alcohol is provided. The method for manufacturing the polyester polyhydric alcohol includes steps as follows. A polybasic acid and a first polyhydric alcohol are mixed for a first oligomerization reaction, so as to form a first oligomer mixture. A second polyhydric alcohol is added into the first oligomer mixture for a second oligomerization reaction when a remaining amount of the first polyhydric alcohol in the first oligomer mixture is lower than or equal to 1 mol %, so as to form a second oligomer mixture. A catalyst is added into the second oligomer mixture for a polycondensation reaction, so as to obtain a polyester polyhydric alcohol product. The polyester polyhydric alcohol product has an Alpha value of lower than 30.

9 Claims, 1 Drawing Sheet

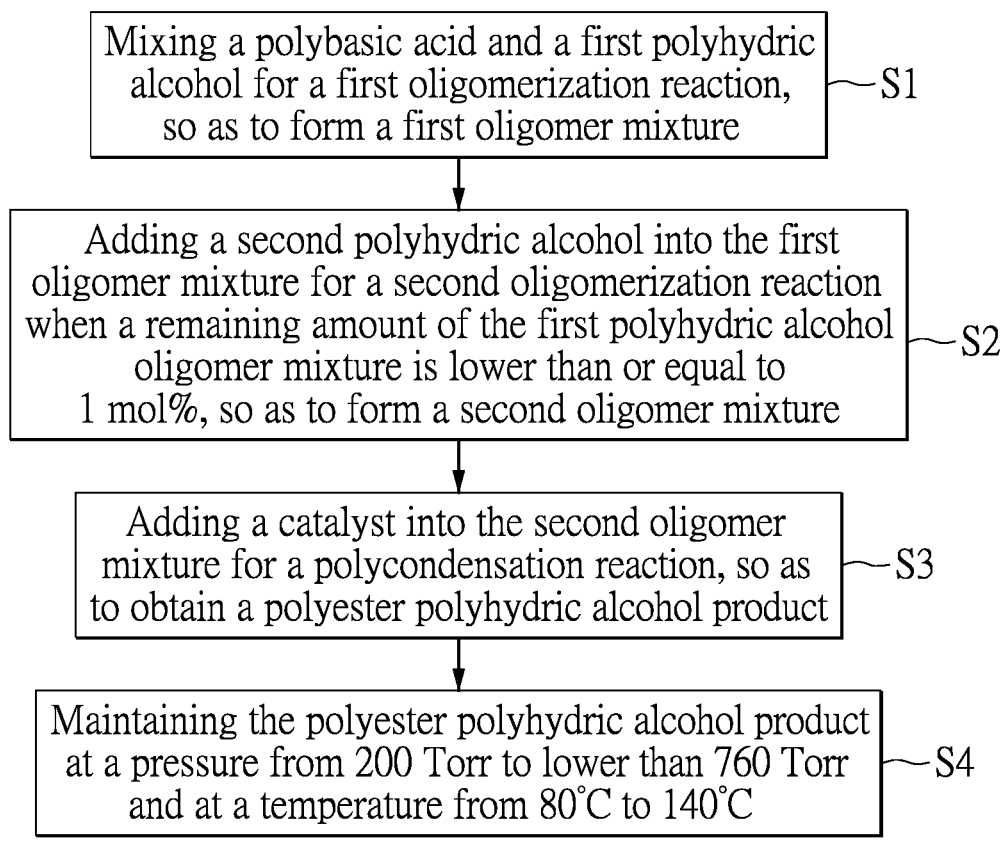

METHOD FOR MANUFACTURING POLYESTER POLYHYDRIC ALCOHOL

CROSS-REFERENCE TO RELATED PATENT APPLICATION

This application claims the benefit of priority to Taiwan Patent Application No. 109128334, filed on Aug. 20, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for manufacturing polyester polyhydric alcohol, and more particularly to a method for manufacturing polyester polyhydric alcohol having a low Alpha (a) value and a low acid value.

BACKGROUND OF THE DISCLOSURE

Polyester polyhydric alcohol has an excellent abrasion resistance, an excellent oil resistance, and a high mechanical strength, and thus is usually used as a main material to synthesize polyurethane.

In consideration of material costs, ethylene glycol is commonly used as a monomer to synthesize the polyester polyhydric alcohol. However, an addition of the ethylene glycol causes the polyester polyhydric alcohol to have a high Alpha value. Generally, the polyester polyhydric alcohol that has a high Alpha value cannot be applied in certain thermoplastic polyurethane products of higher quality.

For example, in a conventional method for manufacturing polyester polyhydric alcohol, adipic acid and 1,4-butanediol are added into a reactor at a nitrogen atmosphere, and an esterification reaction is carried out at a temperature of 210° C. for 6 hours. Subsequently, methanol is added into the reactor, and a polycondensation reaction is carried out at a temperature of 210° C. for 6 hours, so that a polyester polyhydric alcohol product is obtained. Based on the results, the polyester polyhydric alcohol product prepared by the conventional method has an Alpha value of approximately 60 and an acid value of approximately 0.8 g KOH/g.

In addition, in another conventional method for manufacturing polyester polyhydric alcohol, ethylene glycol, 1,4-butanediol, terephthalic acid, and adipic acid are mixed in a reactor at a temperature of 225° C. for an esterification reaction. When an extent of reaction reaches 85%, the reactor is decompressed to create a vacuum environment with a pressure lower than 0.096 MPa. Subsequently, tetrabutyl titanate is added into the reactor for a polycondensation reaction, so as to obtain a polyester polyhydric alcohol product. Based on the results, the polyester polyhydric alcohol product prepared by said another conventional method has an Alpha value of approximately 50 and an acid value of approximately 0.6 mg KOH/g.

Accordingly, there is still room for improvement in how the polyester polyhydric alcohol is conventionally manufactured, such that polyester polyhydric alcohol having a low Alpha value can be obtained.

SUMMARY OF THE DISCLOSURE

In response to the above-referenced technical inadequacy, the present disclosure provides a method for manufacturing polyester polyhydric alcohol.

In one aspect, the present disclosure provides a method for manufacturing polyester polyhydric alcohol. The method for manufacturing the polyester polyhydric alcohol includes steps as follows. A polybasic acid and a first polyhydric alcohol are mixed for a first oligomerization reaction, so as to form a first oligomer mixture. A second polyhydric alcohol is added into the first oligomer mixture for a second oligomerization reaction when a remaining amount of the first polyhydric alcohol in the first oligomer mixture is lower than or equal to 1 mol %, so as to form a second oligomer mixture. A catalyst is added into the second oligomer mixture for a polycondensation reaction, so as to obtain a polyester polyhydric alcohol product. The polyester polyhydric alcohol product has an Alpha value of lower than 30.

In certain embodiments, the first polyhydric alcohol includes ethylene glycol, and the second polyhydric alcohol is selected from the group consisting of: diethylene glycol, triethylene glycol, 1,3-propanediol, 2-methyl-1,3-propanediol, 1,4-butanediol, pentanediol, neopentyl glycol, 3-methyl-1,5-pentanediol, hexanediol, 1,4-cyclohexanedimethanol, glycerin, 1,1,1-trimethylolpropane, pentaerythritol, sorbitol, and combinations thereof.

In certain embodiments, the first oligomerization reaction is carried out at a temperature ranging from 130° C. to 190° C.

In certain embodiments, the first oligomerization reaction is carried out at a pressure ranging from 100 Torr to 760 Torr or lower.

In certain embodiments, the second oligomerization reaction is carried out at a temperature ranging from 130° C. to 190° C.

In certain embodiments, the second oligomerization reaction is carried out at a pressure ranging from 100 Torr to 760 Torr or lower.

In certain embodiments, the second oligomerization reaction continues until an acid value of the second oligomer mixture is lower than or equal to 2 mg KOH/g and is then stopped.

In certain embodiments, the polycondensation reaction is carried out at a temperature ranging from 200° C. to 230° C.

In certain embodiments, the polycondensation reaction is carried out at a pressure ranging from 10 Torr to 760 Torr or lower.

In certain embodiments, the method for manufacturing the polyester polyhydric alcohol further includes: maintaining the polyester polyhydric alcohol product at a pressure ranging from 200 Torr to lower than 760 Torr and at a temperature ranging from 80° C. to 140° C.

In certain embodiments, the polybasic acid, the first polyhydric alcohol, and the second polyhydric alcohol are mixed in a reactor for the first oligomerization reaction or the second oligomerization reaction, a top of the reactor is in fluid communication with a separation column, an unreacted part of the first polyhydric alcohol or the second polyhydric alcohol is refluxed to the reactor through the separation column, and a by-product produced from the first oligomerization reaction or the second oligomerization reaction is removed through the separation column.

In certain embodiments, a molar ratio of a total alcohol group of the first polyhydric alcohol and the second polyhydric alcohol to an acid group of the polybasic acid ranges from 1.1 to 1.5.

In certain embodiments, a molar ratio of the first polyhydric alcohol to the second polyhydric alcohol ranges from 1.1 to 1.2.

In certain embodiments, the polybasic acid is selected from the group consisting of: adipic acid, terephthalic acid, phthalic acid, isophthalic acid, sebacic acid, and any combination thereof.

In certain embodiments, the catalyst is an organic titanium catalyst or an organic tin catalyst.

In certain embodiments, an acid value of the polyester polyhydric alcohol product is lower than or equal to 0.3 mg KOH/g.

Therefore, in the method for manufacturing the polyester polyhydric alcohol provided by the present disclosure, by virtue of "mixing a polybasic acid and a first polyhydric alcohol for a first oligomerization reaction, so as to form a first oligomer mixture" and "adding a second polyhydric alcohol into the first oligomer mixture for a second oligomerization reaction when a remaining amount of the first polyhydric alcohol in the first oligomer mixture is lower than or equal to 1 mol %, so as to form a second oligomer mixture", the polyester polyhydric alcohol product with a low Alpha value and an acid value lower than or equal to 0.3 mg KOH/g can be produced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for manufacturing polyester polyhydric alcohol according to the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method for manufacturing polyester polyhydric alcohol, which includes two oligomerization reactions and one polycondensation reaction. During the two oligomerization reactions, two different polyhydric alcohols are respectively added, and sequentially react with a polybasic acid to carry out the two oligomerization reactions. Subsequently, the polycondensation reaction is carried out, so as to obtain a polyester polyhydric alcohol product with a low Alpha value and a low acid value.

Referring to FIG. 1, FIG. 1 is a flowchart of the method for manufacturing the polyester polyhydric alcohol according to the present disclosure. In step S1, a polybasic acid is mixed with a first polyhydric alcohol for a first oligomerization reaction, so as to form a first oligomer mixture. The term "oligomerization" indicates that monomers are primarily polymerized to form a dimer, a trimer, or a tetramer.

In the present disclosure, the polybasic acid preferably is diprotic acid. For example, the polybasic acid can be selected from the group consisting of: adipic acid, terephthalic acid, phthalic acid, isophthalic acid, sebacic acid, and any combination thereof. However, the present disclosure is not limited thereto. In an exemplary embodiment, the polybasic acid is adipic acid.

In the present disclosure, the first polyhydric alcohol can be selected from the group consisting of: ethylene glycol, diethylene glycol, triethylene glycol, 1,3-propanediol, 2-methyl-1,3-propanediol, 1,4-butanediol, pentanediol, neopentyl glycol, 3-methyl-1,5-pentanediol, hexanediol, 1,4-cyclohexanedimethanol, glycerin, 1,1,1-trimethylolpropane, pentaerythritol, sorbitol, and combinations thereof. However, the present disclosure is not limited thereto. In an exemplary embodiment, the first polyhydric alcohol is dibasic alcohol, and at least includes ethylene glycol.

Specifically, the first oligomerization reaction is carried out at a temperature ranging from 130° C. to 190° C. In addition, the first oligomerization reaction can be carried out at either an atmospheric pressure or a vacuum environment. In other words, the first oligomerization reaction can be carried out at a pressure ranging from 100 Torr to 760 Torr or lower.

In step S2, a second polyhydric alcohol is added into the first oligomer mixture for a second oligomerization reaction when a remaining amount of the first polyhydric alcohol in the first oligomer mixture is lower than or equal to 1 mol %, so as to form a second oligomer mixture.

In the present disclosure, the second polyhydric alcohol is different from the first polyhydric alcohol. The second polyhydric alcohol can be selected from the group consisting of: ethylene glycol, diethylene glycol, triethylene glycol, 1,3-propanediol, 2-methyl-1,3-propanediol, 1,4-butanediol, pentanediol, neopentyl glycol, 3-methyl-1,5-pentanediol, hexanediol, 1,4-cyclohexanedimethanol, glycerin, 1,1,1-trimethylolpropane, pentaerythritol, sorbitol, and combinations thereof. However, the present disclosure is not limited thereto. In an exemplary embodiment, the second polyhydric alcohol can be selected from the group consisting of: diethylene glycol, triethylene glycol, 1,3-propanediol, 2-methyl-1,3-propanediol, 1,4-butanediol, pentanediol, neopentyl glycol, 3-methyl-1,5-pentanediol, hexanediol, 1,4-cyclohexanedimethanol, glycerin, 1,1,1-trimethylolpropane, pentaerythritol, sorbitol, and combinations thereof. In other words, the second polyhydric alcohol does not include ethylene glycol.

Specifically, the second oligomerization reaction is carried out at a temperature ranging from 130° C. to 190° C. In addition, the second oligomerization reaction can be carried out at either an atmospheric pressure or a vacuum environment. In other words, the second oligomerization reaction can be carried out at a pressure ranging from 100 Torr to 760 Torr or lower.

Based on the descriptions above, the first polyhydric alcohol and the second polyhydric alcohol sequentially react with the polybasic acid to carry out the two oligomerization reactions (the first oligomerization reaction and the second oligomerization reaction). Therefore, the Alpha value of the final polyester polyhydric alcohol product can be decreased. Specific experimental results of the two oligomerization reactions of the present disclosure will be illustrated later.

In step S1 and step S2, a molar ratio of a total hydroxyl group of the first polyhydric alcohol and the second polyhydric alcohol to an acid group of the polybasic acid ranges from 1.1 to 1.5. In other words, the polybasic acid is a limiting reagent, and an excessive amount of the polyhydric alcohol (the first polyhydric alcohol and the second polyhydric alcohol) is added. Therefore, an extent of reaction in the oligomerization (the first oligomerization reaction and the second oligomerization reaction) can be precisely determined. In addition, a molar ratio of the first polyhydric alcohol to the second polyhydric alcohol ranges from 1.10 to 1.20.

In an exemplary embodiment, the polybasic acid includes an aliphatic acid. The polyhydric alcohol (the first polyhydric alcohol and the second polyhydric alcohol) includes an aliphatic polyhydric alcohol. Therefore, the polyester polyhydric alcohol product of the present disclosure includes an aliphatic polyester polyhydric alcohol.

Specifically, the oligomerization (the first oligomerization reaction and the second oligomerization reaction) of the present disclosure is carried out in a reactor. A stirrer is installed in the reactor. A top of the reactor is in fluid communication with a separation column. The separation column can enhance a separating effect between the polyhydric alcohol and a by-product. A condenser is installed on a top of the separation column, and is in fluid communication with the reactor. Therefore, a gas separated by the separation column (e.g., the first polyhydric alcohol or the second polyhydric alcohol) can be condensed and then refluxed to the reactor, such that a usage of reactants can be reduced and the oligomerization can be monitored.

The polybasic acid and the polyhydric alcohol (the first polyhydric alcohol and the second polyhydric alcohol) are reacted in the reactor for an esterification reaction. The by-product (water) is produced from the esterification reaction. The by-product (water) is removed through the separation column to prevent a hydrolysis reaction from negatively influencing the oligomerization. Further, the polyhydric alcohol (the first polyhydric alcohol and the second polyhydric alcohol) can be refluxed to the reactor through the separation column after being condensed, so as to continue reacting with the polybasic acid for the oligomerization (the first oligomerization reaction and the second oligomerization reaction).

The second oligomerization reaction continues until the acid value of the second oligomer mixture is lower than or equal to 2 mg KOH/g and is then stopped. However, the present disclosure is not limited thereto. In an exemplary embodiment, the second oligomerization reaction continues until the acid value of the second oligomer mixture is lower than or equal to 1 mg KOH/g and is then stopped.

In step S3, a catalyst is added into the second oligomer mixture for the polycondensation reaction to obtain the polyester polyhydric alcohol product. The term "polycondensation" indicates that the dimer, the trimer, or the tetramer generated in step S1 and step S2 are connected with each other via the acid group and the hydroxyl group at molecular ends through an esterification reaction.

In the present disclosure, the catalyst can be an organic titanium catalyst or an organic tin catalyst, but is not limited thereto. Specifically, the organic titanium catalyst can be at least one of tetrabutyl titanium, tetramethyl titanate, tetraethyl titanate, tetrapropyl titanate, tetraisopropyl titanate, and tetrabutyl titanate. The organic tin catalyst can be at least one of tetrabutyltin, stannous octoate, di-n-butyltin oxide, and monobutyltin oxide. In an exemplary embodiment, the catalyst is tetrabutyl titanium, tetrabutyltin, or any combination thereof.

Specifically, the polycondensation reaction is carried out at a temperature ranging from 200° C. to 230° C. A product of the polycondensation reaction includes the polyester polyhydric alcohol of the present disclosure that has a low Alpha value. Further, the polycondensation can be carried out at a pressure ranging from 10 Torr to 760 Torr or lower. Preferably, the polycondensation can be carried out at a pressure ranging from 10 Torr to lower than 760 Torr. However, the present disclosure is not limited thereto.

Generally, a duration of the polycondensation reaction is positively proportional to a molecular weight of the polyester polyhydric alcohol product. In the present disclosure, the duration of the polycondensation reaction ranges from 30 minutes to 300 minutes. In an exemplary embodiment, the duration of the polycondensation reaction ranges from 30 minutes to 250 minutes. A number average molecular weight of the polyester polyhydric alcohol product ranges from 1000 g/mol to 5000 g/mol. In an exemplary embodiment, the number average molecular weight of the polyester polyhydric alcohol product ranges from 1000 g/mol to 3500 g/mol. Specific experimental results regarding the duration of the polycondensation reaction being positively proportional to the number average molecular weight of polyester polyhydric alcohol product will be illustrated later.

In step S4, the polyester polyhydric alcohol product is maintained at a pressure ranging from 200 Torr to 760 Torr or lower and at a temperature ranging from 80° C. to 140° C., so as to remove the by-product (water) produced from the esterification reaction and to prevent the acid value of the polyester polyhydric alcohol product from increasing.

The specific experimental results are illustrated below to prove the effects of the method for manufacturing the polyester polyhydric alcohol of the present disclosure. The main difference between Examples 1 to 8 and Comparative Examples 1 to 8 is that two oligomerization reactions and one polycondensation reaction are carried out in each of Examples 1 to 8, while only one oligomerization reaction and one polycondensation reaction are carried out in each of Comparative Examples 1 to 8. Further, in Examples 1 to 8, ethylene glycol (the first polyhydric alcohol) which is prone to cause a high Alpha value is reacted in advance with the polybasic acid for the first oligomerization reaction, so as to prevent the ethylene glycol from color change caused by high temperature during subsequent processes (which will further negatively influence the Alpha value of the polyester polyhydric alcohol).

Examples 1 to 4

In Examples 1 to 4, 700 g of adipic acid (the polybasic acid) and 170 g of ethylene glycol (the first polyhydric alcohol) are put into and stirred in a 2 L three-necked glass reactor. The stirrer is installed in the reactor. The separation column is in fluid communication with the top of the reactor.

A temperature of the reactor is set to range from 130° C. to 190° C., and a pressure in the reactor is controlled to be 760 Torr, so as to mix the adipic acid and the ethylene glycol for the first oligomerization reaction and form the first oligomer mixture. During the first oligomerization reaction, the by-product (water) produced from the esterification reaction and the ethylene glycol can be separated by the separation column. The by-product (water) can be removed from the separation column to prevent a hydrolysis reaction. In addition, the ethylene glycol can be refluxed to the reactor from the separation column to save the usage of reactants. During the first oligomerization reaction, samples are taken from the reactor to monitor the remaining amount of the ethylene glycol in the first oligomer mixture. When the remaining amount of the ethylene glycol in the first oligomer mixture is lower than or equal to 1 mol %, the first oligomerization reaction is stopped.

Subsequently, 210 g of 1,4-butanediol (the second polyhydric alcohol) is added into the reactor for the second oligomerization reaction, so as to form the second oligomer mixture. Similarly, during the second oligomerization reaction, the by-product (water) produced from the esterification reaction can be removed through the separation column, and the 1,4-butanediol separated from the separation column can be refluxed to the reactor. The second oligomerization reaction continues until the acid value of the second oligomer mixture is lower than or equal to 2 mg KOH/g and is then stopped.

Then, the temperature of the reactor is set to range from 200° C. to 230° C. for the polycondensation reaction. After the polycondensation reaction has been carried out for 30 minutes to 90 minutes (preferably 45 minutes to 75 minutes), 0.08 g of tetrabutyltin (the catalyst) is put into the reactor, so as to form the polyester polyhydric alcohol product. During the polycondensation reaction, samples are taken from the reactor. The polycondensation reaction continues until the acid value of the polyester polyhydric alcohol product is lower than or equal to 0.3 mg KOH/g and is then stopped. The duration of the polycondensation reaction in each of Examples 1 to 4 is listed in Table 1.

After the polycondensation reaction, the polyester polyhydric alcohol product is maintained at a pressure from 200 Torr to 760 Torr and at a temperature from 80° C. to 140° C., so as to remove the by-product (water) produced from the esterification reaction and to prevent the acid value of the polyester polyhydric alcohol product from increasing. Meanwhile, the number average molecular weight (Mn) and the Alpha value of the polyester polyhydric alcohol product in each of Examples 1 to 4 are measured and listed in Table 1.

Examples 5 to 8

In Examples 5 to 8, 700 g of adipic acid (the polybasic acid) and 170 g of ethylene glycol (the first polyhydric alcohol) are put into and stirred in a 2 L three-necked glass reactor. The stirrer is installed in the reactor. The separation column is in fluid communication with the top of the reactor.

A temperature of the reactor is set to range from 130° C. to 190° C. and a pressure in the reactor is controlled to be 760 Torr, so as to mix the adipic acid and the ethylene glycol for the first oligomerization reaction, and form the first oligomer mixture. During the first oligomerization reaction, the by-product (water) produced from the esterification reaction and the ethylene glycol can be separated by the separation column. The by-product (water) can be removed from the separation column to prevent a hydrolysis reaction. In addition, the ethylene glycol can be refluxed to the reactor from the separation column to save the usage of reactants. During the first oligomerization reaction, samples are taken from the reactor to monitor the remaining amount of the ethylene glycol in the first oligomer mixture. When the remaining amount of the ethylene glycol in the first oligomer mixture is lower than or equal to 1 mol %, the first oligomerization reaction is stopped.

Subsequently, 210 g of 1,4-butanediol (the second polyhydric alcohol) is added into the reactor for the second oligomerization reaction, so as to form the second oligomer mixture. Similarly, during the second oligomerization reaction, the by-product (water) produced from the esterification reaction can be removed through the separation column and the 1,4-butanediol separated from the separation column can be refluxed to the reactor. The second oligomerization reaction continues until the acid value of the second oligomer mixture is lower than or equal to 2 mg KOH/g and is then stopped.

Then, the temperature of the reactor is set to range from 200° C. to 230° C. for the polycondensation reaction. After the polycondensation reaction (preferably 45 minutes to 75 minutes) has carried out for 30 minutes to 90 minutes of, 0.08 g of tetrabutyl titanium (the catalyst) is put into the reactor, so as to form the polyester polyhydric alcohol product. During the polycondensation reaction, samples are taken from the reactor. The polycondensation reaction continues until the acid value of the polyester polyhydric alcohol product is lower than or equal to 0.3 mg KOH/g and is then stopped. The duration of the polycondensation reaction in each of Examples 5 to 8 is listed in Table 2.

After the polycondensation reaction, the polyester polyhydric alcohol product is maintained at a pressure from 200 Torr to 760 Torr and at a temperature from 80° C. to 140° C., so as to remove the by-product (water) produced from the esterification reaction and to prevent the acid value of the polyester polyhydric alcohol product from increasing. Meanwhile, the number average molecular weight (Mn) and the Alpha value of the polyester polyhydric alcohol product in each of Examples 5 to 8 are measured and listed in Table 2.

Comparative Examples 1 to 4

In Comparative Examples 1 to 4, 700 g of adipic acid (the polybasic acid), 170 g of ethylene glycol (the first polyhydric alcohol) and 210 g of 1,4-butanediol (the second polyhydric alcohol) are put into and stirred in a 2 L three-necked glass reactor. The stirrer is installed in the reactor. The separation column is in fluid communication with the top of the reactor.

A temperature of the reactor is set to range from 130° C. to 190° C., and a pressure in the reactor is controlled to be 760 Torr, so as to mix the adipic acid, the ethylene glycol, and the 1,4-butanediol for oligomerization reaction and form an oligomer mixture. During the oligomerization reaction, the by-product (water) produced from the esterification reaction, the ethylene glycol and the 1,4-butanediol (the polyhydric alcohol) can be separated by the separation column. The by-product (water) can be removed from the separation column to prevent a hydrolysis reaction. In addition, the 1,4-butanediol (the polyhydric alcohol) can be refluxed to the reactor from the separation column to save the usage of reactants. During the oligomerization reaction, samples are taken from the reactor to monitor the acid value of the oligomer mixture. When the acid value of the oligomer mixture is lower than or equal to 2 mg KOH/g, the oligomerization reaction is stopped.

Subsequently, 0.08 g of tetrabutyltin (the catalyst) is added into the reactor, and the temperature of the reactor is set to range from 200° C. to 230° C. for the polycondensation reaction, so as to form the polyester polyhydric alcohol product. During the polycondensation reaction, samples are taken from the reactor. The polycondensation reaction continues until the acid value of the polyester polyhydric alcohol product is lower than or equal to 0.3 mg KOH/g and is then stopped. The duration of the polycondensation reaction in each of Comparative Examples 1 to 4 is listed in Table 1.

After the polycondensation reaction, the polyester polyhydric alcohol product is maintained at a pressure from 200 Torr to 760 Torr and at a temperature from 80° C. to 140° C., so as to remove the by-product (water) produced from the esterification reaction and to prevent the acid value of the polyester polyhydric alcohol product from increasing. Meanwhile, the number average molecular weight (Mn) and the Alpha value of the polyester polyhydric alcohol product in each of Comparative Examples 1 to 4 are measured and listed in Table 1.

Comparative Examples 5 to 8

In Comparative Examples 5 to 8, 700 g of adipic acid (the polybasic acid) and 170 g of ethylene glycol (the first polyhydric alcohol) and 210 g of 1,4-butanediol (the second polyhydric alcohol) are put into and stirred in a 2 L three-necked glass reactor. The stirrer is installed in the reactor. The separation column is in fluid communication with the top of the reactor.

A temperature of the reactor is set to range from 130° C. to 190° C. and a pressure in the reactor is controlled to be 760 Torr, so as to mix the adipic acid, the ethylene glycol, and the 1,4-butanediol for oligomerization reaction and form the oligomer mixture. During the oligomerization reaction, the by-product (water) produced from the esterification reaction, and the ethylene glycol and the 1,4-butanediol (the polyhydric alcohol) can be separated by the separation column. The by-product (water) can be removed from the separation column to prevent a hydrolysis reaction. In addition, the 1,4-butanediol (the polyhydric alcohol) can be refluxed to the reactor from the separation column to save the usage of reactants. During the oligomerization reaction, samples are taken from the reactor to monitor the acid value of the oligomer mixture. When the acid value of the oligomer mixture is lower than or equal to 2 mg KOH/g, the oligomerization reaction is stopped.

Subsequently, 0.06 g of tetrabutyl titanium (the catalyst) is added into the reactor and the temperature of the reactor is set to range from 200° C. to 230° C. for the polycondensation reaction so as to form the polyester polyhydric alcohol product. During the polycondensation reaction, samples are taken from the reactor. The polycondensation reaction continues until the acid value of the polyester polyhydric alcohol product is lower than or equal to 0.3 mg KOH/g and is then stopped. The duration of the polycondensation reaction in each of Comparative Examples 5 to 8 is listed in Table 2.

After the polycondensation reaction, the polyester polyhydric alcohol product is maintained at a pressure from 200 Torr to 760 Torr and a temperature from 80° C. to 140° C., so as to remove the by-product (water) produced from the esterification reaction and to prevent the acid value of the polyester polyhydric alcohol product from increasing. Meanwhile, the number average molecular weight (Mn) and the Alpha value of the polyester polyhydric alcohol product in each of Comparative Examples 5 to 8 are measured and listed in Table 2.

TABLE 1

| | | Example | | | | Comparative Example | | | |
| --- | --- | --- | --- | --- | --- | --- | --- | --- | --- |
| | | 1 | 2 | 3 | 4 | 1 | 2 | 3 | 4 |
| Duration of polycondensation reaction (min.) | | 60 | 150 | 190 | 210 | 55 | 154 | 180 | 225 |
| Polyester polyhydric alcohol | Mn (g/mol) | 1291 | 2018 | 2674 | 3018 | 1191 | 2114 | 2573 | 3114 |
| | Alpha value | 20 | 25 | 20 | 25 | 50 | 45 | 50 | 75 |
| | Acid value (mg KOH/g) | 0.21 | 0.22 | 0.19 | 0.18 | 0.20 | 0.23 | 0.18 | 0.19 |

TABLE 2

| | | Example | | | | Comparative Example | | | |
| --- | --- | --- | --- | --- | --- | --- | --- | --- | --- |
| | | 5 | 6 | 7 | 8 | 5 | 6 | 7 | 8 |
| Duration of polycondensation reaction (min.) | | 62 | 154 | 187 | 226 | 54 | 160 | 181 | 217 |
| Polyester polyhydric alcohol | Mn (g/mol) | 1374 | 2159 | 2548 | 3225 | 1075 | 2551 | 2442 | 3123 |
| | Alpha value | 20 | 20 | 20 | 20 | 60 | 50 | 60 | 80 |
| | Acid value (mg KOH/g) | 0.24 | 0.18 | 0.21 | 0.25 | 0.23 | 0.24 | 0.20 | 0.19 |

According to Table 1 and Table 2, through two oligomerization reactions (i.e., the first oligomerization reaction and the second oligomerization reaction), the method of the present disclosure can manufacture the polyester polyhydric alcohol product that has the Alpha value lower than 30 and the acid value lower than or equal to 0.3 mg KOH/g. Preferably, the polyester polyhydric alcohol product has the Alpha value lower than or equal to 25 and the acid value lower than or equal to 0.25 mg KOH/g. Therefore, the polyester polyhydric alcohol product manufactured by the method of the present disclosure can be applied in some high-quality polyurethane products.

According to Table 1 and Table 2, the number average molecular weight of the polyester polyhydric alcohol of the present disclosure ranges from 1000 g/mol to 5000 g/mol. Preferably, the number average molecular weight of the polyester polyhydric alcohol of the present disclosure ranges from 1000 g/mol to 3500 g/mol. Therefore, the polyester polyhydric alcohol product of the present disclosure can be applied in some polyurethane products that have high quality and soft texture.

BENEFICIAL EFFECTS OF THE EMBODIMENTS

In conclusion, in the method for manufacturing the polyester polyhydric alcohol provided by the present disclosure, by virtue of "mixing a polybasic acid and a first polyhydric alcohol for a first oligomerization reaction, so as to form a first oligomer mixture" and "adding a second polyhydric alcohol into the first oligomer mixture for a second oligomerization reaction when a remaining amount of the first polyhydric alcohol in the first oligomer mixture is lower than or equal to 1 mol %, so as to form a second oligomer mixture", the polyester polyhydric alcohol product having an Alpha value lower than 30 and an acid value lower than or equal to 0.3 mg KOH/g can be produced.

Further, in the method for manufacturing the polyester polyhydric alcohol provided by the present disclosure, by virtue of "having the second oligomerization reaction proceed until the acid value of the second oligomer mixture is lower than or equal to 2 mg KOH/g, and is then stopping the second oligomerization reaction", the number average molecular weight of the polyester polyhydric alcohol can be controlled.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing polyester polyhydric alcohol, comprising:
   mixing a polybasic acid and a first polyhydric alcohol for a first oligomerization reaction, so as to form a first oligomer mixture; wherein the first polyhydric alcohol only includes ethylene glycol, and the first oligomerization reaction is carried out at a temperature ranging from 130° C. to 190° C.;
   adding a second polyhydric alcohol into the first oligomer mixture for a second oligomerization reaction when a remaining amount of the first polyhydric alcohol in the first oligomer mixture is lower than or equal to 1 mol %, so as to form a second oligomer mixture; wherein the second polyhydric alcohol is 1,4-butanediol, and the second oligomerization reaction is carried out at a temperature ranging from 130° C. to 190° C.; and
   adding a catalyst into the second oligomer mixture to initiate a polycondensation reaction at the temperature ranges from 200° C. to 230° C., so as to obtain a polyester polyhydric alcohol product.

2. The method according to claim 1, wherein the first oligomerization reaction is carried out at a pressure ranging from 100 Torr to 760 Torr.

3. The method according to claim 1, wherein the second oligomerization reaction is carried out at a pressure ranging from 100 Torr to 760 Torr.

4. The method according to claim 1, wherein the second oligomerization reaction continues until an acid value of the second oligomer mixture is lower than or equal to 2 mg KOH/g, and is then stopped.

5. The method according to claim 1, wherein the polycondensation reaction is carried out at a pressure ranging from 10 Torr to 760 Torr.

6. The method according to claim 1, further comprising: maintaining the polyester polyhydric alcohol product at a pressure ranging from 200 Torr to lower than 760 Torr and at a temperature ranging from 80° C. to 140° C.

7. The method according to claim 1, wherein the polybasic acid is selected from the group consisting of: adipic acid, terephthalic acid, phthalic acid, isophthalic acid, sebacic acid, and any combination thereof.

8. The method according to claim 1, wherein the catalyst is an organic titanium catalyst or an organic tin catalyst.

9. The method according to claim 1, wherein an acid value of the polyester polyhydric alcohol product is lower than or equal to 0.3 mg KOH/g.

* * * * *